(12) United States Patent
Line et al.

(10) Patent No.: US 11,091,070 B2
(45) Date of Patent: Aug. 17, 2021

(54) SUSPENSION SYSTEM FOR VEHICLE SEAT (71) Applicant: Ford Global Technologies, LLC, Dearborn, MI (US)

(72) Inventors: Johnathan Andrew Line, Northville, MI (US); Gregory Hagedorn, Bloomfield Hills, MI (US); Spencer Hoernke, Dundas (CA); Marcos Silva Kondrad, Macomb Township, MI (US); S. M. Akbar Berry, Windsor (CA)

(73) Assignee: Ford Global Technologies, LLC, Dearborn, MI (US)

( * ) Notice: Subject to any disclaimer, the term of this patent is extended or adjusted under 35 U.S.C. 154(b) by 197 days.

(21) Appl. No.: 16/414,033

(22) Filed: May 16, 2019

(65) Prior Publication Data
US 2020/0361349 A1 Nov. 19, 2020

(51) Int. Cl.
| | |
|---|---|
| *B60N 2/42* | (2006.01) |
| *B60N 2/14* | (2006.01) |
| *B60N 2/02* | (2006.01) |
| *B60N 2/50* | (2006.01) |
| *B60N 2/68* | (2006.01) |
| *B60N 2/427* | (2006.01) |
| *B60N 2/06* | (2006.01) |

(52) U.S. Cl.
CPC ......... *B60N 2/4214* (2013.01); *B60N 2/0284* (2013.01); *B60N 2/14* (2013.01); *B60N 2/502* (2013.01); *B60N 2/506* (2013.01); *B60N 2/682* (2013.01); *B60N 2/02* (2013.01); *B60N 2/06* (2013.01); *B60N 2/143* (2013.01); *B60N 2/427* (2013.01); *B60N 2/42763* (2013.01); *B60N 2/42781* (2013.01); *B60N 2/686* (2013.01)

(58) Field of Classification Search
CPC ...... B60N 2/4214; B60N 2/682; B60N 2/506; B60N 2/0284; B60N 2/14; B60N 2/502; B60N 2/42763; B60N 2/42781; B60N 2/143; B60N 2/06; B60N 2/686; B60N 2/02; B60N 2/427
USPC .......................................................... 296/63
See application file for complete search history.

(56) References Cited

U.S. PATENT DOCUMENTS

| | | | |
|---|---|---|---|
| 2,736,566 | A | 3/1953 | Hartl |
| 5,340,185 | A | 8/1994 | Vollmer |
| 5,460,427 | A | 10/1995 | Serber |
| 5,556,160 | A | 9/1996 | Mikami |
| 5,558,399 | A | 9/1996 | Serber |
| 5,695,242 | A | 12/1997 | Brantman et al. |
| 5,908,219 | A | 6/1999 | Böhmler |
| 6,386,631 | B1 | 5/2002 | Masuda et al. |
| 8,272,687 | B2 * | 9/2012 | Gross ................. B60N 2/42718 297/216.1 |
| 9,616,776 | B1 * | 4/2017 | Kondrad .............. B60N 2/0284 |

* cited by examiner

*Primary Examiner* — Joseph D. Pape
*Assistant Examiner* — Dana D Ivey
(74) *Attorney, Agent, or Firm* — David Coppiellie; Price Heneveld LLP (57) ABSTRACT

A vehicle seating assembly including a seat cushion and a seat frame assembly with a carrier assembly and a displaceable platform coupled to the carrier assembly and selectively deployable from a design position to a fully deployed position in response to a sudden deceleration of the vehicle.

17 Claims, 12 Drawing Sheets

SUSPENSION SYSTEM FOR VEHICLE SEAT

FIELD OF THE DISCLOSURE

The present disclosure generally relates to a vehicle seating assembly, and more specifically to a vehicle seating assembly designed to regulate the position of a seating assembly passenger during a sudden vehicle deceleration.

BACKGROUND OF THE INVENTION

A vehicle seating assembly may have features that may limit the movement of a passenger on a vehicle seat.

SUMMARY OF THE INVENTION

According to a first aspect of the present disclosure, a vehicle seating assembly includes a seat cushion and a seat frame assembly with a carrier assembly and a displaceable platform coupled to the carrier assembly and selectively deployable from a design position to a fully deployed position in response to a sudden deceleration of the vehicle.

Embodiments of the first aspect of the present disclosure can include any one or a combination of the following features:
- the seat cushion is disposed on the displaceable platform;
- the carrier assembly includes a carrier with first and second opposing segments and a third segment extending between the first and second opposing segments;
- the carrier assembly also includes a cross member disposed laterally across the first and second opposing segments of the carrier;
- the carrier assembly further includes a panel extending between the cross member and the third segment of the carrier;
- the cross member includes a rotating joint defined by a housing that extends between the first and second opposing segments of the carrier and a rotating member disposed within the housing and is attached to the displaceable platform;
- the rotating member rotates within the housing when the displaceable platform moves between the design position and the fully deployed position;
- the displaceable platform includes a first portion and a second portion;
- a hinge assembly is disposed between the first portion and the second portion;
- the second portion is pivotably coupled to the first portion;
- the hinge assembly defines an axis about which the second portion rotates when the displaceable platform moves between the design position and the fully deployed position;
- the vehicle seating assembly includes bolsters protruding from the second portion of the displaceable platform;
- a retention mechanism extends between the second portion of the displaceable platform and the carrier;
- the retention mechanism is in a collapsed position when the displaceable platform is in a design position;
- the retention mechanism is in a fully extend position when the displaceable platform is in the fully deployed position;
- the retention mechanism includes a two bar linkage;
- the displaceable platform is coupled to the carrier assembly with a fuse extending between the displaceable platform and the panel; and
- the fuse breaks in response to a force indicative of the sudden deceleration of the vehicle.

According to a second aspect of the present disclosure, a vehicle seat includes a foam cushion with a carrier coupled to a seat frame assembly and including first and second segments disposed on opposing sides of the foam cushion. A displaceable platform extends below the foam cushion and between the first and second segments, wherein the displaceable platform is movable between a design position and a fully deployed position in response to a force exerted on the displaceable platform. The displaceable platform is rotationally coupled to a cross member that extends between the first and second segments of the carrier, wherein a retention mechanism is disposed between the displaceable platform and the carrier, and the retention mechanism limits movement of a front portion of the displaceable platform.

Embodiments of the second aspect of the present disclosure can include any one or a combination of the following features:
- the cross member includes a circular housing that surrounds a rotating shaft;
- the displaceable platform is coupled to the rotating shaft;
- the panel includes a first portion and a second portion, wherein the second portion of the panel is pivotably coupled to the first portion of the panel; and
- the retention mechanism limits movement of the front portion of the panel.

According to a third aspect of the present disclosure, a suspension system for a vehicle seat includes a displaceable platform coupled to a carrier assembly, wherein the displaceable platform is movable along the carrier assembly between a design position and a fully deployed position in response to a sudden deceleration of a vehicle. An attachment mechanism is disposed between the displaceable platform and the carrier assembly, and the attachment mechanism engages the displaceable platform to the carrier assembly when the carrier assembly is in the design position. The attachment mechanism disengages the displaceable platform from the carrier assembly when the carrier assembly is in the fully deployed position.

Embodiments of the third aspect of the present disclosure can include any one or a combination of the following features:
- the carrier assembly includes a carrier with first and second opposing segments and a third segment extending between the first and second opposing segments;
- a cross member extends between the first and second opposing segments and includes a housing that surrounds a rotating shaft and a retention mechanism disposed between the carrier and the displaceable platform;
- the attachment mechanism includes a fuse; and
- the displaceable platform includes a hinge assembly disposed between a first portion of the displaceable platform and a second portion of the displaceable platform.

These and other aspects, objects, and features of the present disclosure will be understood and appreciated by those skilled in the art upon studying the following specification, claims, and appended drawings.

BRIEF DESCRIPTION OF THE DRAWINGS

In the drawings:

FIG. 1A is a side perspective view of the suspension system of FIG. 10A in a fully deployed position;

DETAILED DESCRIPTION OF THE PREFERRED EMBODIMENTS

Figure 1:
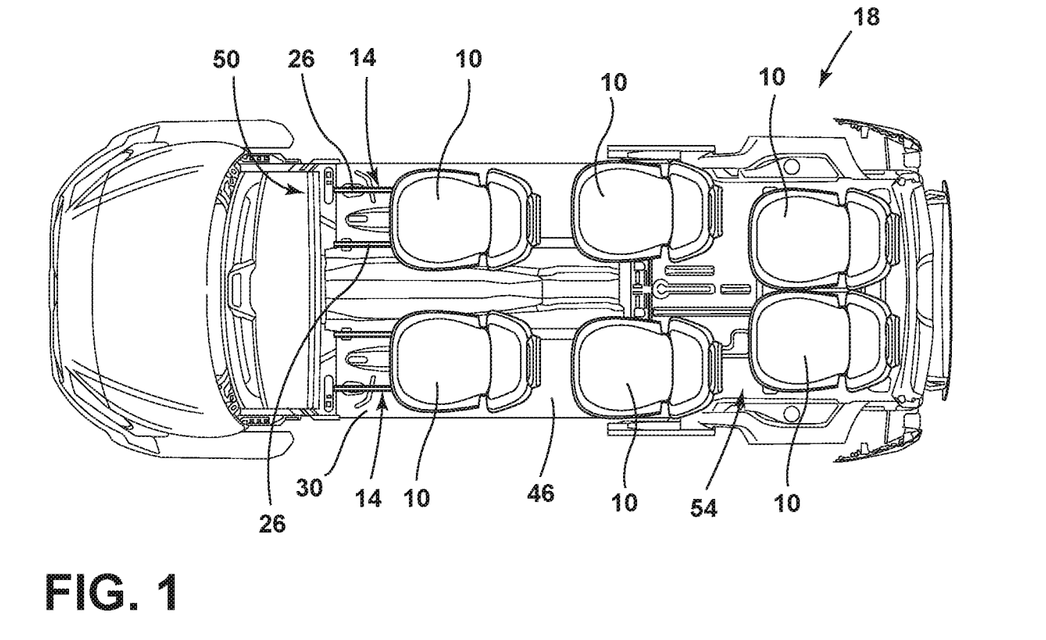
FIG. 1 is a top plan view of a portion of a vehicle having a plurality of seating assemblies in a first configuration.

For purposes of description herein, the terms "upper," "lower," "right," "left," "rear," "front," "vertical," "horizontal," and derivatives thereof shall relate to the concepts as oriented in vehicle 18 of FIG. 1. However, it is to be understood that the concepts may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

With reference to the seating assembly 10 described below and shown in the attached figures, a seating assembly 10 may be described from the vantage point of a passenger 12 seated in the seating assembly 10. The side of a seating assembly 10 disposed on a right side of a seated passenger 12 may be referred to as a right side or a first side of the seating assembly 10. The side of a seating assembly 10 disposed on a left side of a seated passenger 12 may be referred to as a left side or a second side of the seating assembly 10.

Figure 2:
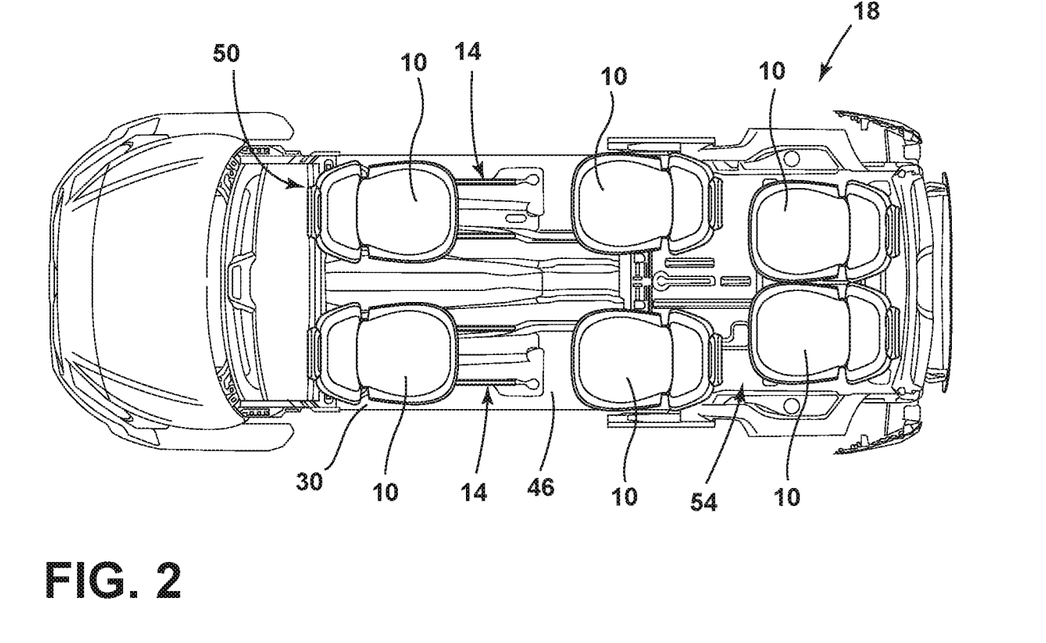
FIG. 2 is a top plan view of a portion of a vehicle having a plurality of seating assemblies in a second configuration.
Figure 3:
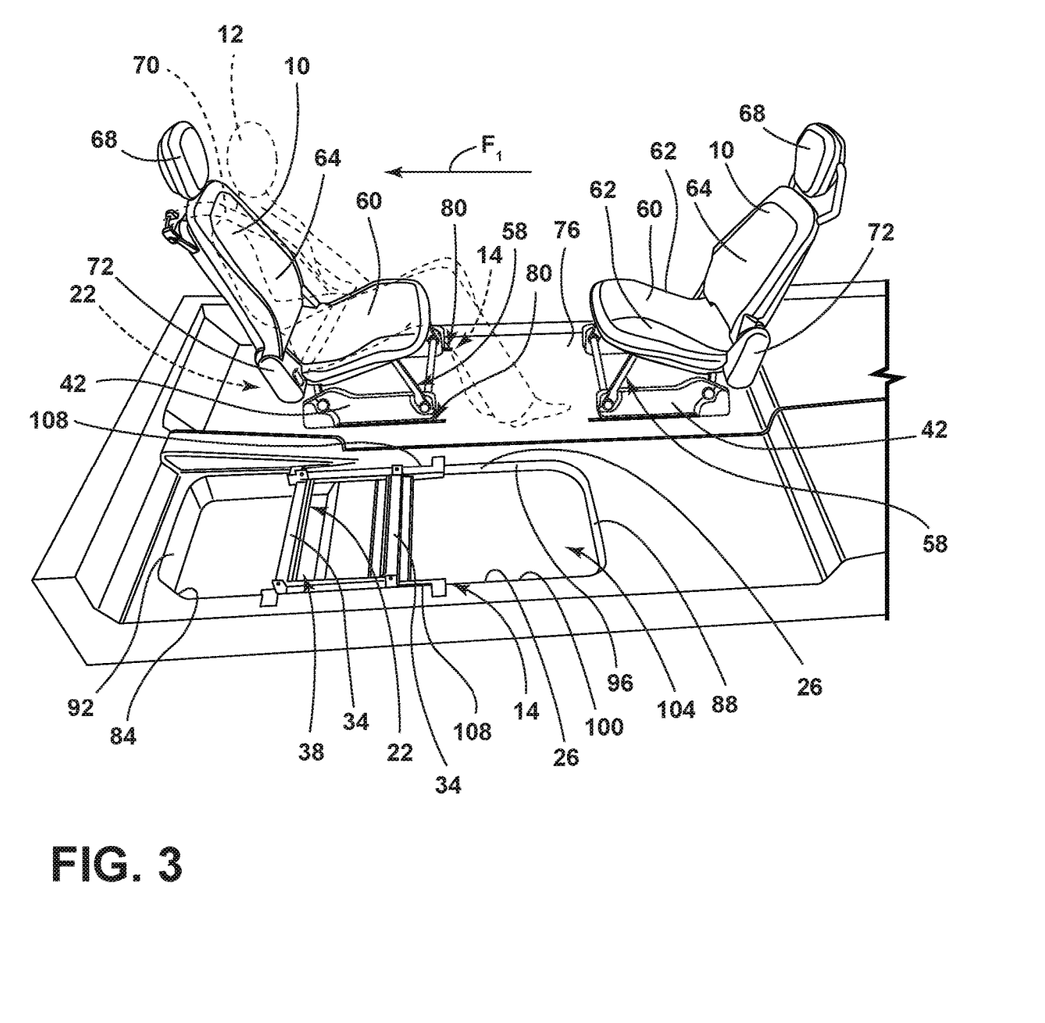
FIG. 3 is a side perspective view of a floor of a vehicle including a plurality of seating assemblies and a track assembly.

Referring to FIGS. 1-3, a vehicle seating assembly 10 may include various features for providing movability of the vehicle seating assembly 10. The vehicle seating assembly 10 may include a track assembly 14 for translating the vehicle seating assembly 10 fore and aft within the vehicle 18. The track assembly 14 may be a long track assembly 14 or a short track assembly 14 for full or partial movement of the seating assembly 10 within the vehicle 18, respectively. The seating assembly 10 may further include a platform 22 extending between tracks 26 of the track assembly 14. The platform 22 and the track assembly 14 may be integrated into the vehicle underbody frame 30 to provide structural stiffness and side-impact performance. The platform 22 includes cross members 34 configured to allow the structural stiffness needed for side-impact performance to move with the seating assembly 10, allowing the seating assembly 10 to be moved into various positions while maintaining structural support. Further, the platform 22 may also include a universal attachment system 38 to allow various seating assemblies to couple with the platform 22 including, for example, rotating seating assemblies. Also, a seating assembly 10 may have a base member 42 that may be a module that may be received by the universal attachment system 38 of the platform 22. The platform 22 may include extendable, or widening, cross members 34 that may be adjustable to configure the platform 22 to receive base members 42 of various widths that may correspond to seating assemblies 10 of various widths.

Referring now to FIGS. 1 and 2, a vehicle underbody frame 30 is shown having a plurality of seating assemblies 10. The vehicle underbody frame 30 may include a floor panel 46 configured to support the plurality of seating assemblies 10. The vehicle underbody frame 30 may further include a front area 50 and a rear area 54. One or more of the plurality of seating assemblies 10 may be configured as the movable vehicle seating assembly 10. It is contemplated that the vehicle 18 may be any type of vehicle, for example a car, a truck, a van, or other vehicle. It is also contemplated that the vehicle 18 may be an autonomous vehicle. It is also contemplated that the concept set forth in this disclosure may be utilized in the front area 50 of the vehicle 18 as well as the rear area 54 of the vehicle 18, depending on the configuration of the vehicle 18.

A portion of the plurality of seating assemblies 10 of FIGS. 1 and 2 is shown positioned within the front area 50 of the vehicle 18 with one or more of the plurality of seating assemblies 10 being configured as a movable vehicle seating assembly 10. Another portion of the plurality of seating assemblies 10 may be positioned elsewhere within the vehicle 18. The plurality of seating assemblies 10 may be operably coupled to the floor panel 46 of the vehicle 18 by track assemblies 14. Any one of the plurality of seating assemblies 10 may be configured as a movable vehicle seating assembly 10. The vehicle seating assemblies 10 may be translatable along the respective track assembly 14 between a first position of the seating assembly 10 (FIG. 1) and a second position of the seating assembly 10 (FIG. 2). Additionally, the vehicle seating assemblies 10 may be rotatable relative to the platform 22 using a swivel assembly (not shown). Where the vehicle seating assemblies 10 are rotatable, the vehicle seating assemblies 10 may further be movable between a forward facing position in the vehicle 18 (FIG. 1) and a rearward facing position in the vehicle 18 (FIG. 2).

Referring now to FIG. 3, the seating assembly 10 may include a seat 60 and a seatback 64. The seat 60 may be disposed above the base member 42. A linkage assembly 58 for securing the seat 60 to the base member 42 may be disposed between the seat 60 and the base member 42. The seat 60 may include bolsters 62 that may be disposed on opposing sides of the seat 60. The seatback 64 may be pivotally coupled to the seat 60. A headrest 68 may be coupled to the seatback 64. The passenger 12 may be restrained by a seat belt 70. According to various examples, the seating assembly 10 may include covers 72 positioned on either side of the seating assembly 10.

A floor cover 76 may be positioned above and parallel to the floor panel 46 and may be configured to conceal the track assembly 14. The floor cover 76 may define a plurality of slots 80. The plurality of slots 80 may be defined over the tracks 26 of the track assembly 14, such that the platform 22 may extend at least partially through the plurality of slots 80 to couple to the track assembly 14. Each of the slots 80 may be defined to have a length selected to allow movement of the seating assembly 10 between the first position of the seating assembly 10 (FIG. 1) and the second position of the seating assembly 10 (FIG. 2).

The floor cover 76 may further conceal a cutout 84 of the floor panel 46. The cutout 84 may be configured to house the track assembly 14. The cutout 84 may include front and rear walls 88, 92 and sidewalls 96, 100. The sidewalls 96, 100 may be spaced apart and may frame a void 104 of the cutout 84. The track assembly 14 may be positioned within the void 104. In various examples, the platform 22 may at least partially be positioned within the void 104 and the track assembly 14. The track assembly 14 may include guides 108 positioned on first and second sides of the seating assembly 10 and operably coupled with the cutout 84. The guides 108 may be positioned in pairs. Each guide 108 may be operably coupled with one of the sidewalls 96, 100, such that the track assembly 14 is recessed within the cutout 84, as the seating assembly 10 is translated between the first position of the seating assembly 10 (FIG. 1) and the second position of the seating assembly 10 (FIG. 2).

Referring to FIGS. 1-16, a vehicle seating assembly 10 includes a seat cushion 112 and a seat frame assembly 116. The seat frame assembly 116 includes a carrier assembly 120 and a displaceable platform 124 coupled to the carrier assembly 120. The displaceable platform 124 is selectively deployable from a design position A to a fully deployed position B in response to a sudden deceleration of the vehicle (represented by a force $F_1$ in FIG. 3).

Vehicle purchasers may seek out new and flexible vehicle interior experiences. Vehicles that may provide new and flexible vehicle interior experiences may include traditional vehicles, autonomous vehicles, and people-moving vehicles. Vehicles that may provide new and flexible interior experiences may include various safety features for protecting passengers during a sudden deceleration of the vehicle (represented by a force $F_1$ in FIG. 3). These safety features may include seat belts, airbags, anti-submarining seat designs, and other passenger restraints.

Figure 4:
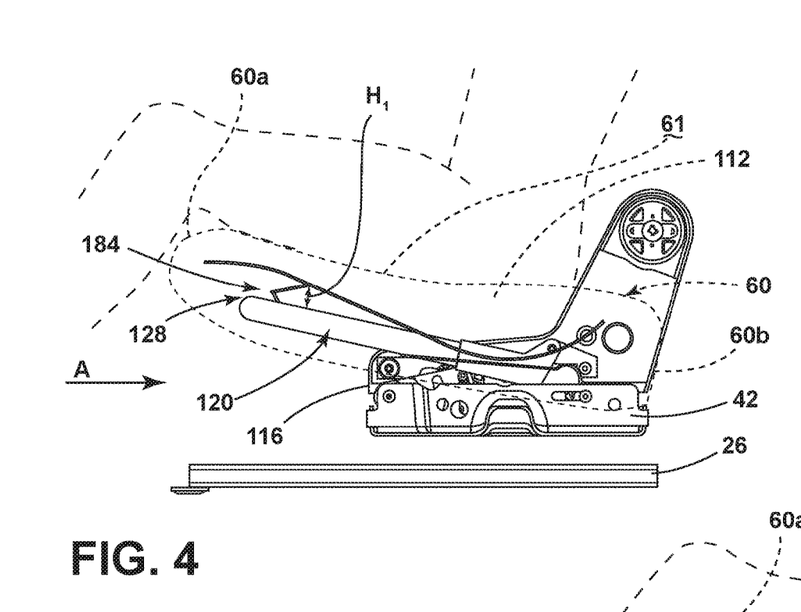
FIG. 4 is a schematic side elevational view of a suspension system in a design position.

Referring to FIG. 4, the suspension system 128 is shown in a design position A. The suspension system 128 may be disposed under or in a seat cushion 112. The suspension system 128 may be coupled to a seat frame assembly 116 or other seating assembly support structure. It is contemplated that the suspension system 128 may be used in a seating assembly 10 including a seat 60 and a seatback 64. The suspension system 128 may include a carrier assembly 120, a displaceable platform 124, and attachments between the carrier assembly 120 and the displaceable platform 124. In the example shown, the attachments between the carrier assembly 120 and the displaceable platform 124 may include fuses 136, a rotating joint 140, and a retention mechanism 144. The suspension system 128 may be coupled to a base member 42. The base member 42 may be a module that may be coupled to a universal attachment system 38 of the track assembly 14. In the example shown, the base member 42 is shown disposed above tracks 26. In the example shown in FIG. 4, the retention mechanism 144 is shown in a collapsed position a. The retention member 144 may have a height $H_1$. The height $H_1$ may be measured from a line that is substantially parallel to the carrier 148 to the intersection of the retention mechanism 144 with the displaceable platform 124.

Figure 5:
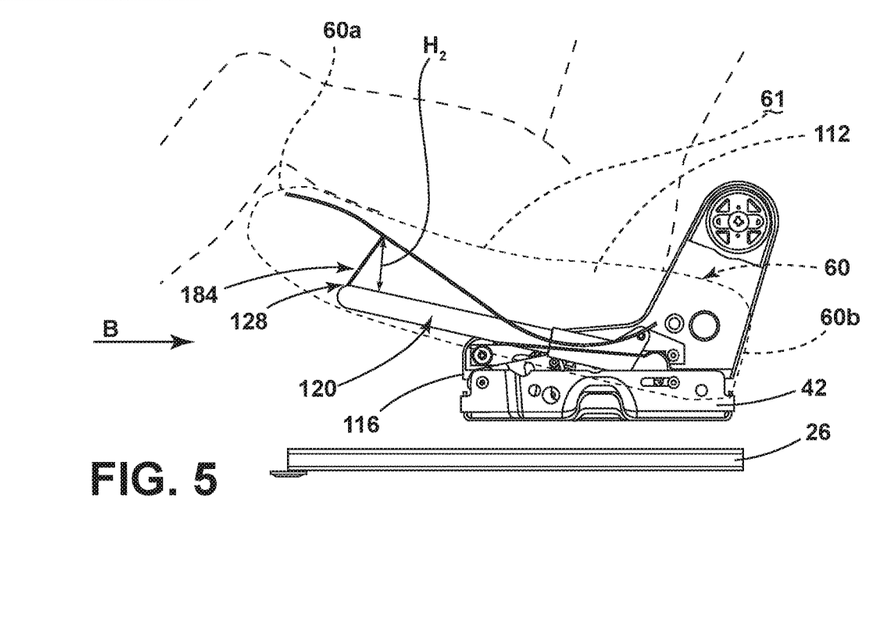
FIG. 5 is a schematic side elevational view of the suspension system of FIG. 4 in a fully deployed position.

Referring to FIG. 5, the suspension system 128 is shown in a fully deployed position B. When the vehicle 18 experiences a sudden deceleration (as represented by a force $F_1$ in FIG. 3), then the displaceable platform 124 may move from a design position A to a fully deployed position B. In the fully deployed position B, a retention mechanism 144 disposed between the carrier assembly 120 and the displaceable platform 124 may limit movement of the carrier assembly 120. As previously stated, the retention mechanism 144 may be in the collapsed position a when the displaceable platform 124 is in the design position A (FIG. 4). The retention mechanism 144 may be in the fully extended position b (FIG. 5) when the displaceable platform 124 is in the fully extended position b. In the collapsed position a, the retention mechanism 144 may have a height $H_1$ (FIG. 4). In the fully deployed position B, the retention mechanism 144 may have a height $H_2$ (FIG. 5). Height $H_2$ may be greater than height $H_1$. The design of the retention mechanism 144 may limit the upward movement of the displaceable platform to a predetermined height $H_2$. As such, the height $H_2$ may be a predetermined height selected to regulate movement of the passenger 12 along the seat surface 61.

Figure 6:
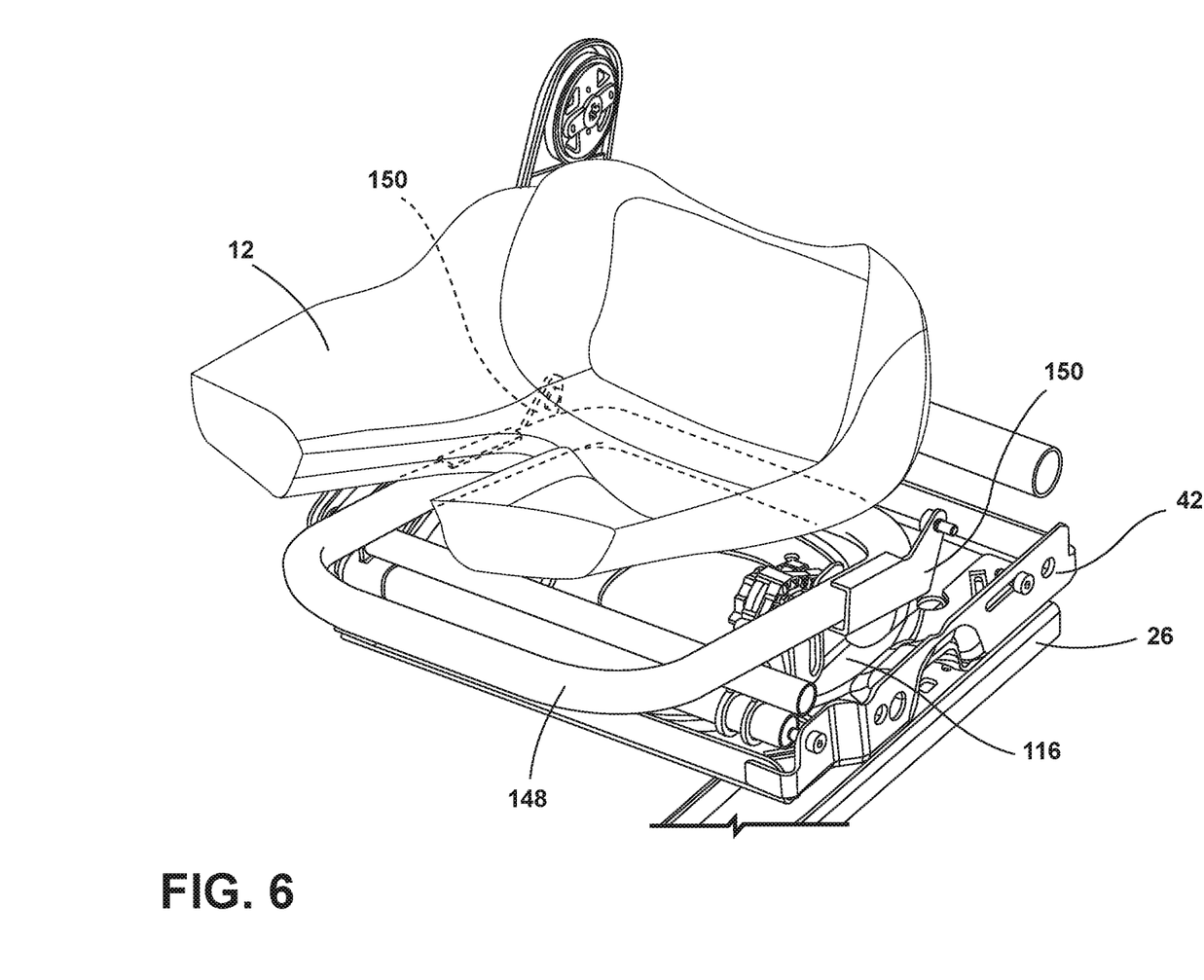
FIG. 6 is a side perspective view of a carrier and a base member in the design position.

Referring to FIG. 6, a front perspective view is shown of the passenger disposed above the carrier 148. The carrier 148 is shown coupled to the seat frame assembly 116 with opposing brackets 150. In the example shown, the brackets 150 may fixedly attach the carrier 148 to the seat frame assembly 116. The seat frame assembly 116 may be disposed in the base member 42. The base member 42 may be coupled to the tracks 26. As previously explained, the base member 42 may also be a module that may be received by the universal attachment system 38 of the platform 22. As such, the carrier 148 may be mounted to the seat frame assembly 116, and a base member 42 may house the seat frame assembly 116.

Figure 7A:
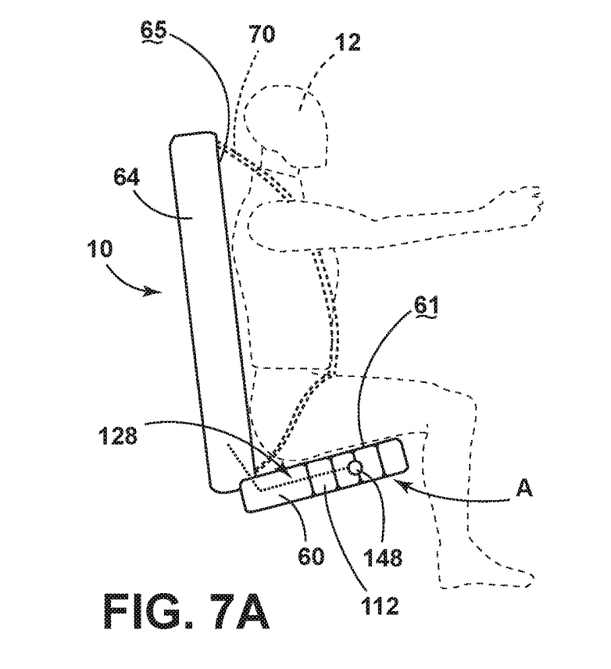
FIG. 7A is a side schematic view of a seating assembly with a suspension system in a design position.

Referring now to FIG. 7A, a schematic side view is shown of a passenger in a seating assembly 10. The seating assembly 10 may include a seat 60 and a seatback 64. A seat surface 61 is shown on the seat 60. A seatback surface 65 is shown on the seatback 64. A passenger 12 is shown seated in the seating assembly 10. A seat belt 70 may be disposed over the passenger 12. The suspension system 128 is shown within the seat cushion 112. A cross section of the carrier 148 is shown as a circle. The suspension system 128 is shown in the design position A.

Figure 7B:
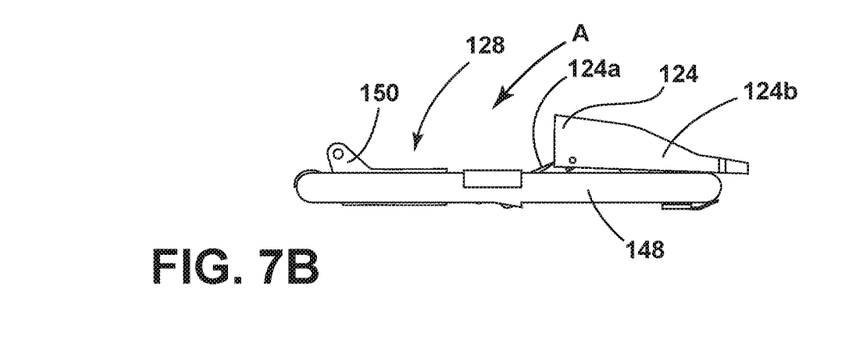
FIG. 7B is a side elevational view of a suspension system represented in FIG. 7A in a design position.

Referring to FIG. 7B, the suspension system 128 is shown in the design position A that corresponds to the design position A of the suspension system 128 shown in FIG. 7A.

Figure 8A:
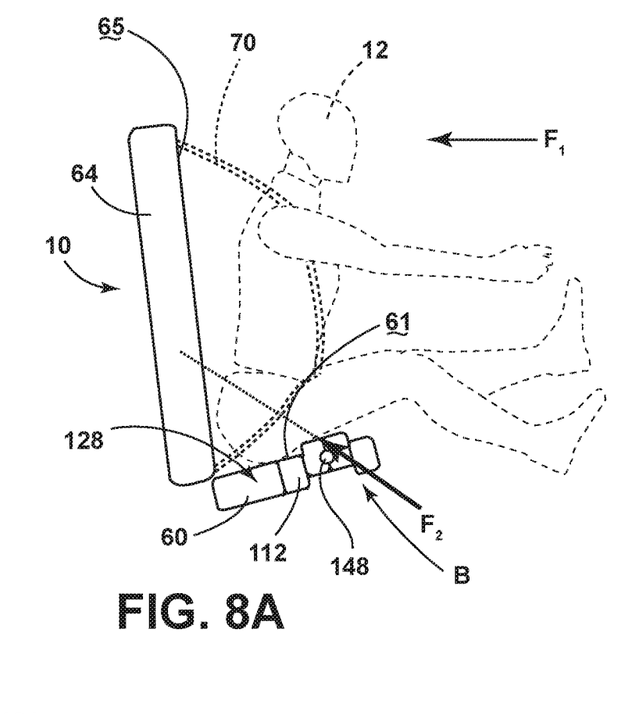
FIG. 8A is a side schematic view of a seating assembly with a suspension system in a fully deployed position.

Referring to FIG. 8A, a schematic side view is shown of a passenger 12 in the seating assembly 10. A seat belt 70 may be disposed over the passenger 12. The suspension system 128 is shown within the seat cushion 112. The suspension system 128 is shown in the fully deployed position B. Upon a sudden deceleration of vehicle 18 (as represented by a force $F_1$ in FIG. 3), the suspension system 128 may be designed to provide a force $F_2$ to the hips and legs of the seated passenger 12 to regulate, in combination with the seat belt 70, the movement of the passenger 12 away from the seatback 64 and along a seat surface 61 of the seat 60. The seat cushion 112 is shown with the portion of the seat cushion 112 proximate the circular cross section of the carrier 148 displaced upward to represent the suspension system 128 in the fully deployed position B.

Figure 8B:
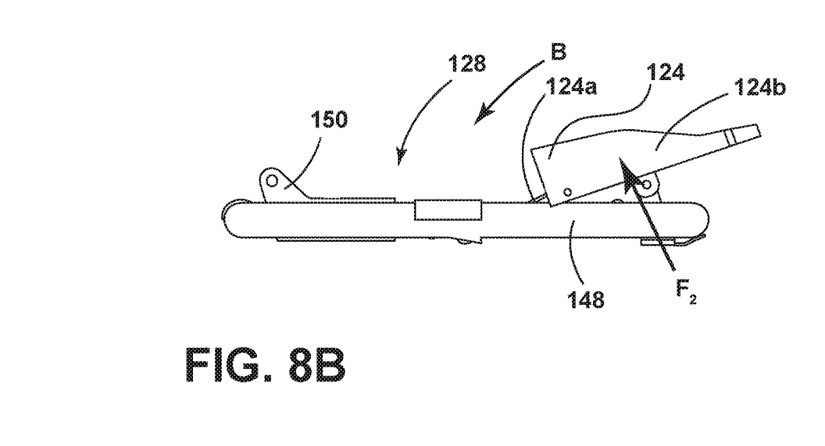
FIG. 8B is a side elevational view of a suspension system represented in FIG. 8A in a fully deployed position.

Referring to FIG. 8B, the suspension system 128 is shown in the fully deployed position B that corresponds to the fully deployed position B of the suspension system 128 shown in FIG. 8A.

Figure 9A:
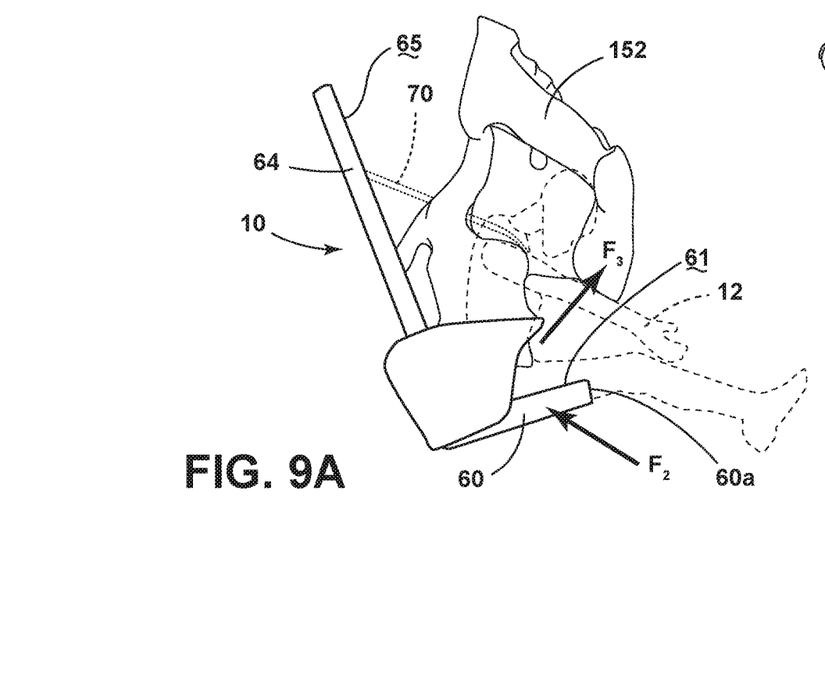
FIG. 9A is a side schematic view of a seating assembly with a suspension system in a fully deployed position and an airbag in a deployed position.

Referring now to FIG. 9A, a schematic side view is shown of a passenger 12 in a seating assembly 10. A passenger 12 is shown traveling into an airbag 152. The airbag 152 may be similar to the airbag disclosed in U.S. patent application Ser. No. 16/370,519, entitled Seat Assembly with Full Seatback Airbag, filed Mar. 29, 2019, and U.S. patent application Ser. No. 16/370,617, entitled Seat Assembly with Full Seatback Airbag, filed Mar. 29, 2019, both of which are hereby incorporated herein by reference in their entireties. In the example shown, a sudden deceleration of the vehicle 18 has occurred (as represented by a force $F_1$ in FIG. 3).

With reference to FIGS. 9A-11B, in response to the sudden deceleration represented by force $F_1$ in FIG. 3, the displaceable platform 124 of the suspension system 128 may move from a design position A to a fully deployed position B to exert force $F_2$ on the hips and legs of the passenger 12. The force $F_2$ exerted by the displaceable platform 124 in the fully deployed position B may restrain, along with the seat belt 70 and the airbag 152, the passenger 12 from moving along the seat surface 61 and away from the seatback 64. In response to forces $F_1$ and $F_2$, the passenger 12 may also move forward and exert a force $F_3$ on the airbag 152. The airbag 152 may deploy to restrain the movement of the passenger 12 in the direction away from the seatback 64.

It is to be appreciated that the suspension system 128 may be used with a variety of vehicle restraints (for example, seat belt 70, airbag 152, and other restraints) to limit movement of a passenger 12 along a seat surface 61 during a sudden deceleration of the vehicle 18 (shown by arrow $F_1$ in FIG. 3). For example, the suspension system 128 may be installed in a seating assembly 10 equipped with only a seat belt 70. The suspension system 128 may be installed in a seating assembly 10 equipped with a seat belt 70 and an airbag 152. The suspension system 128 may be installed in a seating assembly 10 equipped with only an airbag 152. The suspension system 128 may also be designed for use by a passenger 12 who does not use a seat belt 70 that is provided in a seating assembly 10, wherein the seating assembly 10 is equipped with an airbag 152. It is contemplated that in addition to or instead of a seat belt 70 and/or an airbag 152, another restraint may be used to minimize the likelihood of a passenger 12 moving along the seat surface 61 and away from the seatback 64 (i.e., submarining) during a sudden vehicle 18 deceleration represented by a force $F_1$ in FIG. 3. It is contemplated that the suspension system 128 may be used with a restraint that minimizes the likelihood of a passenger 12 moving away from a seat surface 61 and a seatback surface 65 in the event of a sudden deceleration of a vehicle 18. As such, the suspension system 128 may be utilized in combination with other passenger restraints to limit the movement of a passenger 12 during a sudden deceleration of a vehicle 18 (represented by $F_1$ in FIG. 3).

Referring again to FIG. 9A, the suspension system 128 and the seat cushion 112 may activate passively to cause the displaceable platform 124 to decelerate the passenger 12 and direct the passenger 12 in an upward trajectory (as represented by the arrow showing force $F_3$) toward an airbag 152 that may deploy from the seatback 64 over the head of a passenger 12. In one example, the displaceable platform 124 may be a composite material. The displaceable platform 124 may move from the design position A to the fully deployed position B during a vehicle 18 deceleration depicted by arrow $F_1$ in FIG. 3. The movement of the displaceable platform 124 from the design position A to the fully deployed position B may cause the trim and the foam of the seat 60, including bolsters 62 (see FIG. 3) on the seat cushion 112, to act as a comfortable and anthropomorphically-correct way to restrain the hips and legs of a passenger 12 and to allow for controlled deceleration of a passenger 12 after a sudden vehicle 18 deceleration represented by force $F_1$ in FIG. 3. In various examples, the seat cushion 112 may include a foam and trim design that may allow the bolsters 62 on the front portion 60a of the seat 60 to articulate upward and to catch and decelerate the hips and legs of the passenger 12 during a sudden deceleration represented by $F_1$ in FIG. 3.

Figure 9B:
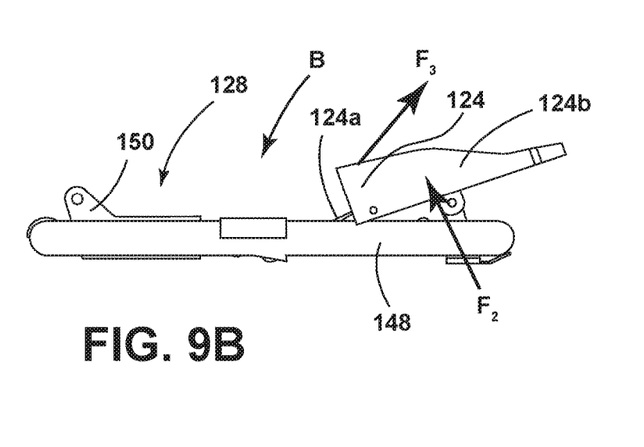
FIG. 9B is side elevational view of a suspension system represented in FIG. 9A in a fully deployed position.

With reference now to FIG. 9B, the suspension system 128 is shown in the fully deployed position B that corresponds to the fully deployed position B of the suspension system 128 shown in FIG. 9A.

Figure 10A:
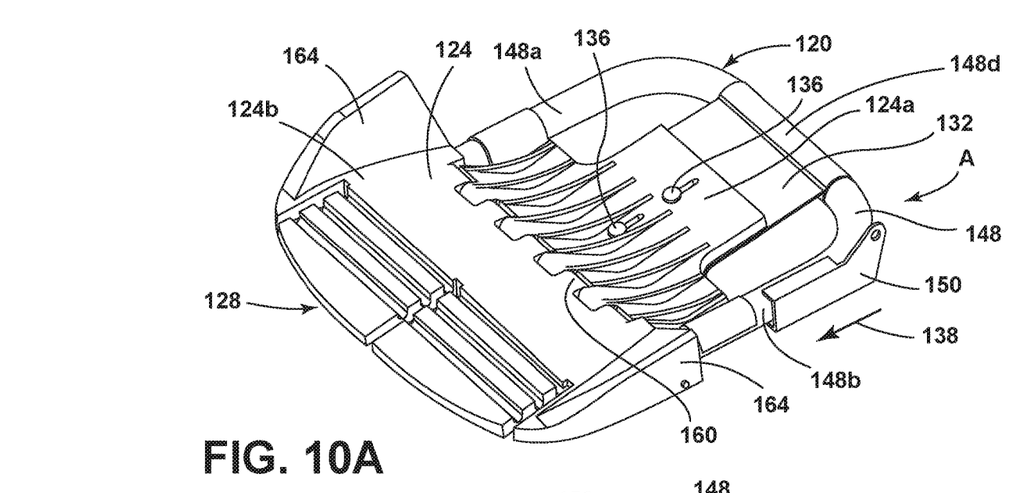
FIG. 10A is a side perspective view of a suspension system in a design position.
Figure 10B:
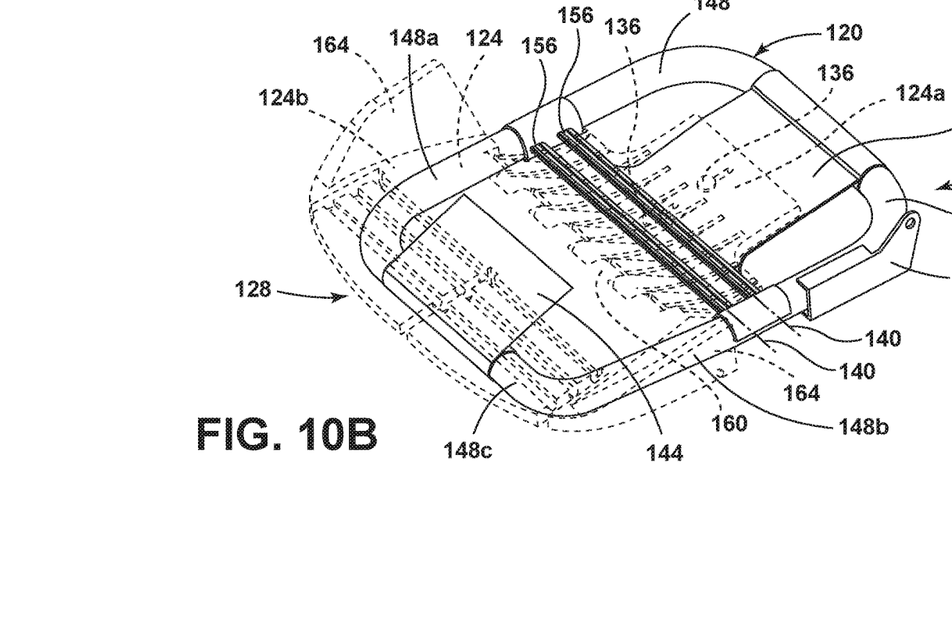
FIG. 10B is a side perspective view of a portion of the suspension system shown in FIG. 10A in the design position.
Figure 10C:
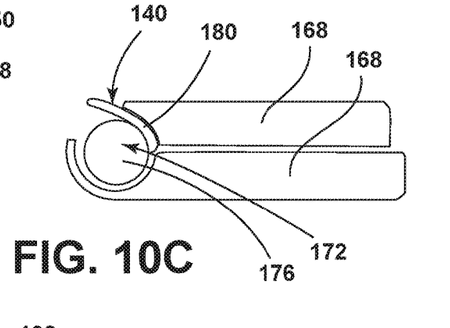
FIG. 10C is a side perspective view of a cross member including a rotating joint.

Referring now to FIGS. 10A-10B, the suspension system 128 is shown in the design position A. The suspension system 128 may include a carrier assembly 120 and a displaceable platform 124 coupled to the carrier assembly 120. The displaceable platform 124 may be selectively deployable from a design position A to a fully deployed position B in response to a sudden deceleration of the vehicle 18 represented by force $F_1$ in FIG. 3. The carrier assembly 120 may include a carrier 148, cross members 156, and a panel 132. The carrier 148 may include first and second opposing segments 148a, 148b. The carrier 148 may include a third segment 148c extending between the first and second opposing segments 148a, 148b. The cross members 156 may be disposed laterally across the first and second opposing segments 148a, 148b of the carrier 148. A panel 132 may extend between the cross members 156 and the fourth segment 148d of the carrier 148.

With continued reference to FIGS. 10A-10B, the displaceable platform 124 may include a first portion 124a and a second portion 124b. A hinge assembly 160 may be disposed between the first portion 124a of the displaceable platform 124 and the second portion 124b of the displaceable platform 124. The second portion 124b of the displaceable platform 124 may be pivotably coupled to the first portion 124a of the displaceable platform 124. Bolsters 164 may protrude from the second portion 124b of the displaceable platform 124. The displaceable platform 124 may be attached to the carrier assembly 120 with one or more fuses 136 in the displaceable platform 124 that may act as hard attachments to the panel 132 of the carrier assembly 120 during standard driving conditions and seating assembly abuse conditions. In an example where the displaceable platform 124 is made of a composite material, the fuses 136 may be defined by a purposefully weak point in the composite material that is designed to break at a predetermined load. The predetermined load may include a load exerted by a seated passenger 12 on the displaceable platform 124 in response to the force $F_1$ shown in FIG. 3 due to a sudden deceleration of the vehicle 18 and a load exerted on the seated passenger 12 by a restraint (such as by a seat belt 70, airbag 152, or other restraint disposed proximate the waist and/or upper body of the seated passenger 12). In an example where the displaceable platform 124 is made of a metal material, the fuse 136 may include a weak point that may include a thinned out area or a deformable material. In an example where the displaceable platform 124 is made of a metal material, the fuse may experience necking down as the displaceable platform 124 moves from the design position A to the fully deployed position B in the direction shown by arrow 138. The fuse 136 may include a necking down metal material. In various examples, an abuse condition may include a placement of a knee load on the suspension system 128 or placement of heavy cargo loads on the seat surface 61. The fuses 136 may release when front impact loads exceed a predetermined force based on front impact pulses or energies. In one example, a front impact load may be a sudden deceleration of the vehicle 18 as represented by $F_1$ in FIG. 3.

With reference to FIG. 10B, the cross members 156 may include a rotating joints 140. The rotating joints 140 may include a housing 168 that may partially surround a rotating member 172. The rotating member 172 may include a shaft 176 and a connector 180. The connector 180 may be fixed to the displaceable platform 124. The housing 168 may extend between the first and second opposing segments 148*a*, 148*b* of the carrier 148. The rotating member 172 may be disposed within the housing 168 and attached to the displaceable platform 124. A retention mechanism 144 may be disposed between the second portion 124*b* of the displaceable platform 124 and the carrier 148.

Figure 13:
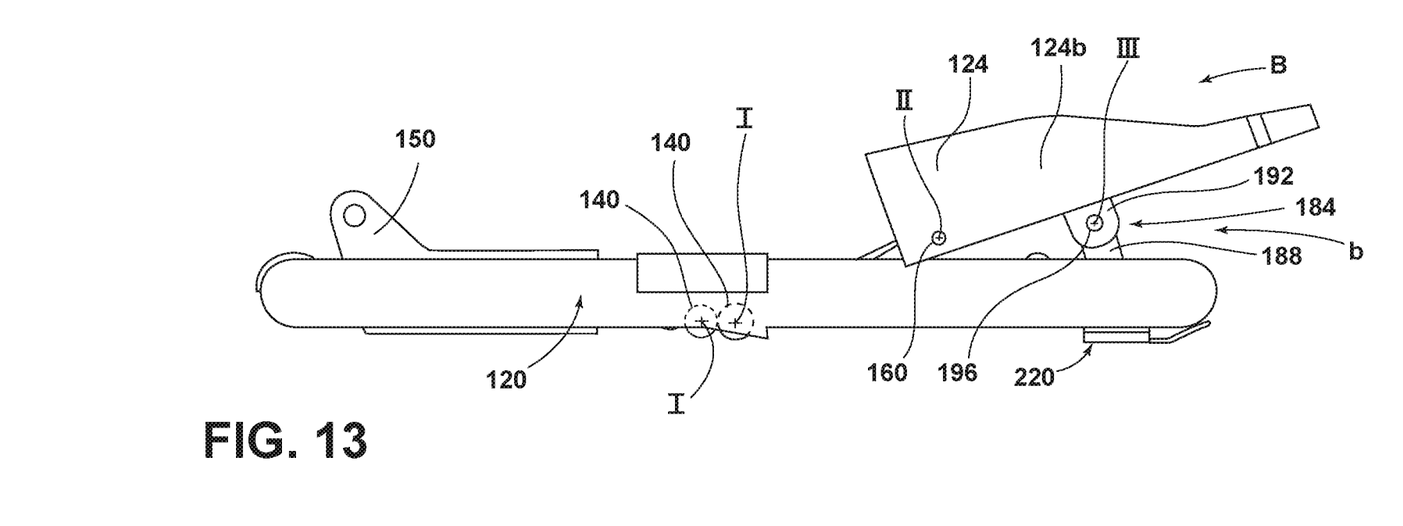
FIG. 13 is a side elevational view of the suspension system of FIG. 12 in a fully deployed position.

Referring to FIGS. 10B and 13, the retention mechanism 144 may comprise a two bar linkage 184. The two bar linkage 184 may include a first bar 188, a second bar 192, and a fastener 196. When the displaceable platform 124 is in the design position A, the retention mechanism 144 may be in a collapsed position a.

Figures 11A, 11B:
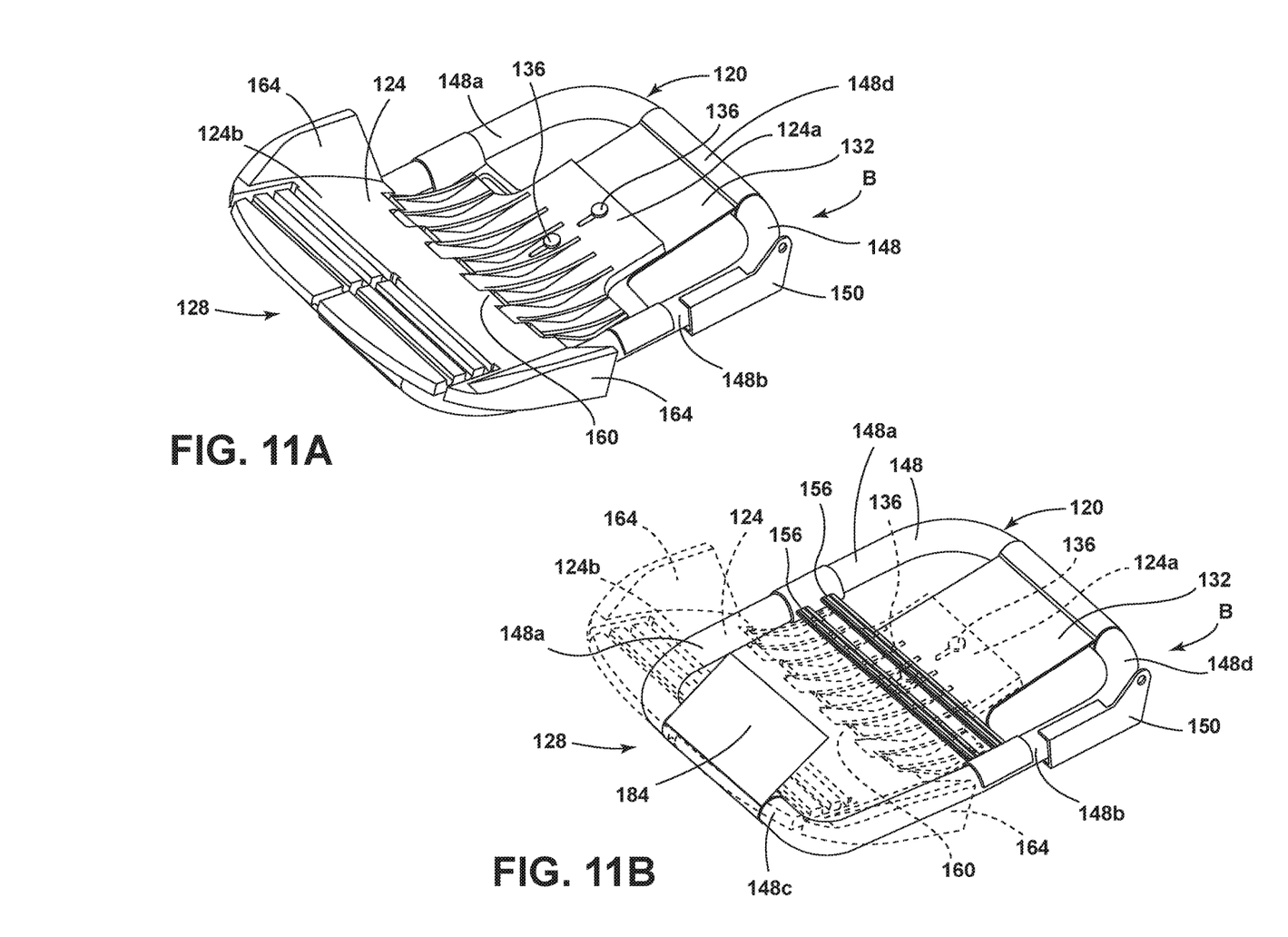
FIG. 11B is a side perspective view of a portion of the suspension system shown in FIG. 11A in a fully deployed position.

Referring now to FIG. 11A, the displaceable platform 124 is shown in the fully deployed position B. A sudden deceleration of the vehicle 18 shown by arrow $F_1$ in FIG. 3 may cause the passenger 12 and the displaceable platform 124 to move away from the seatback 64. In response to the force $F_1$ from the sudden vehicle deceleration and the restraint of the passenger 12 by a seat belt 70, an airbag 152, or other restraint, the displaceable platform 124 may move toward the front portion 60*a* of the seat 60.

With continued reference to FIG. 11A, as the displaceable platform 124 moves toward the front portion 60*a* of the seat 60, the rotating members 172 rotates within the housings 168 so that the first portion 124*a* of the displaceable platform 124 pushes the second portion 124*b* of the displaceable platform 124 upward. As the second portion 124*b* of the displaceable platform 124 is pushed upward, the retention mechanism 144 moves from a collapsed position a in the design position A of the displaceable platform 124 to a fully extended position b in the fully deployed position B of the displaceable platform 124. As such, the retention mechanism 144 may limit the rotation of the second portion 124*b* of the displaceable platform 124 about the hinge assembly 160. The rotation of the second portion 124*b* of the displaceable platform 124 about the hinge assembly 160 may be limited to secure the passenger 12 in a predetermined position.

With reference to FIG. 11B, the displaceable platform 124 and the carrier assembly 120 are shown in the fully deployed position B. The retention mechanism 144 is shown in the fully deployed position B. As such, in the example shown, when a sudden deceleration occurs, the fuses 136 break and the displaceable platform 124 moves toward the front portion 60*a* of the seat 60, the rotating members 172 rotate within the housings 168, and the retention mechanism 144 moves from a collapsed position a to a fully extended position b. In response to the sudden deceleration of the vehicle 18 represented by $F_1$, the second portion 124*b* of the displaceable platform 124 moves upward from the design position A to the fully deployed position B to limit the passenger 12 restrained by a seat belt 70 or other restraint from moving under the seat belt 70 or other restraint and along the seat surface 61.

Figure 12:
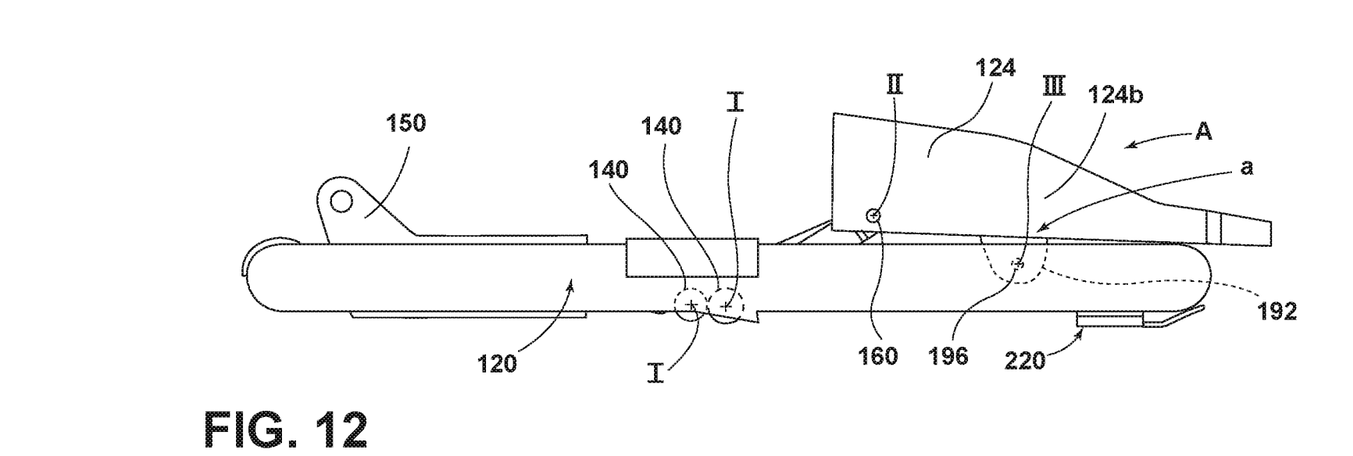
FIG. 12 is a side elevational view of a suspension system in a design position.

With reference now to FIG. 12, the carrier assembly 120, the displaceable platform 124, and the bracket 150 for securing the carrier assembly 120 to the seat frame assembly 116 are shown in the design position A. The two bar linkage 184 is shown in the collapsed position a. An anchor member 220 may secure the two bar linkage 184 to the carrier 148. First pivot points I may be disposed at an axis defined by the rotating joints 140. Second pivot point II may be disposed at an axis defined by the hinge assembly 160 that may be disposed between the first portion 124*a* and the second portion 124*b* of the displaceable platform 124. Third pivot point III may be disposed at an axis defined by the fastener 196 disposed between the first bar 188 and the second bar 192 of the two bar linkage 184.

With reference to FIG. 13, the carrier assembly 120 and the displaceable platform 124 are shown the fully deployed position B. The two bar linkage 184 is shown in the fully extended position b.

Figure 14:
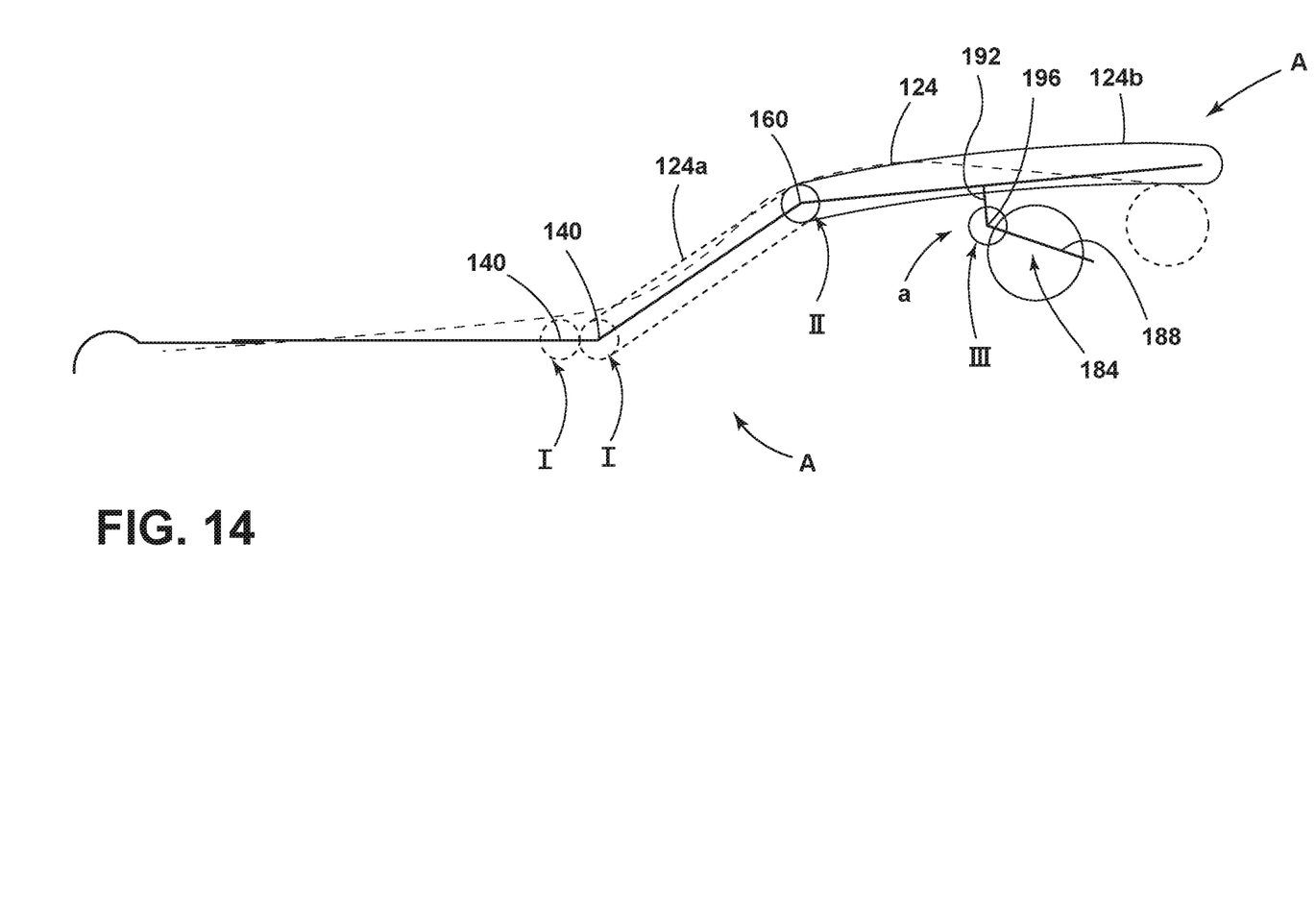
FIG. 14 is a schematic representation of a suspension system in a design position.
Figure 15:
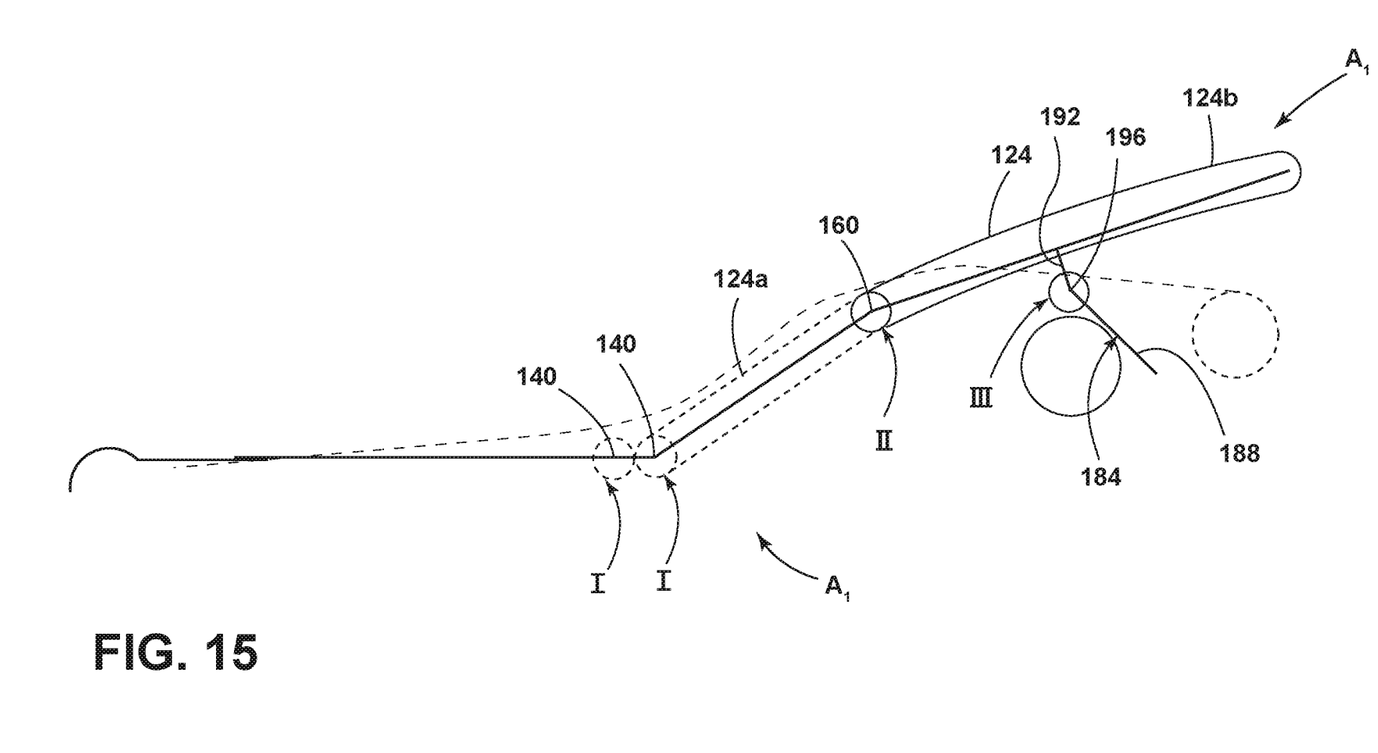
FIG. 15 is a schematic representation of a suspension system in an intermediate deployed position.
Figure 16:
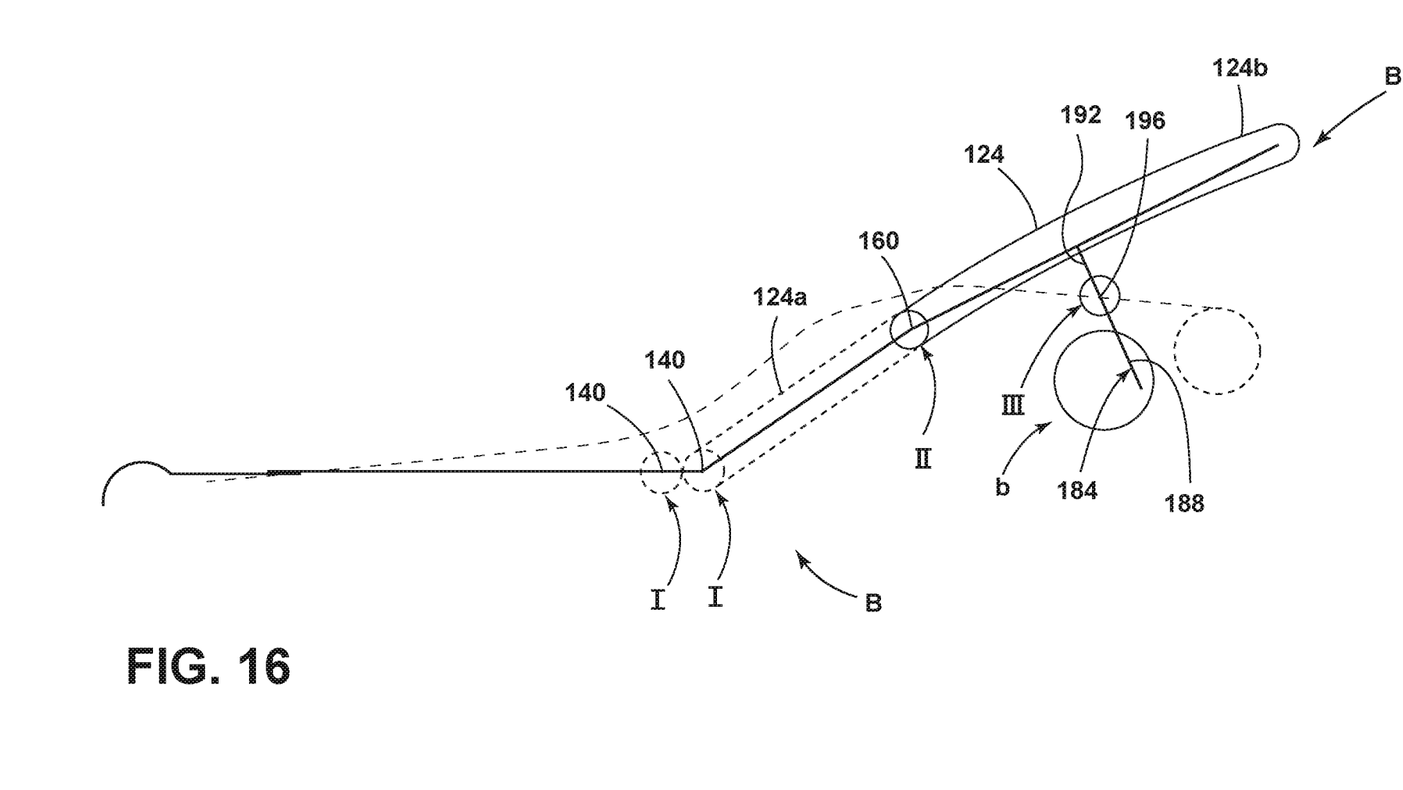
FIG. 16 is a schematic representation of a suspension system in a fully deployed position.

Referring now to FIGS. 14-16, schematic views are shown of the movement of the displaceable platform 124 between the design position A (FIG. 14), an intermediate deployed position Ai (FIG. 15), and a fully deployed position B (FIG. 16). FIGS. 14-16 show the panel, the first portion 124*a* of the displaceable platform 124, the second portion 124*b* of the displaceable platform 124, and the retention mechanism 144 (two bar linkage 184). The displaceable platform 124 may be pivotably coupled to the carrier 148 (not shown) with the rotating joints 140. The rotating joints 140 may define the first pivot points I.

With continuing reference to FIGS. 14-16, a second pivot point II defined by the hinge assembly 160 may be disposed between the first portion 124*a* of the displaceable platform 124 and the second portion 124*b* of the displaceable platform 124. A third pivot point III defined by the fastener 196 of the two bar linkage 184 may be disposed between the first bar 188 of the two bar linkage 184 and the second bar 192 of the two bar linkage 184. In the example shown, the first and second pivot points I, II may be fixed. In the example shown, the third pivot point III may be movable as the displaceable platform 124 moves between a design position A and a fully deployed position B. As such, a representation of movement of the displaceable platform 124 between the design position A and the fully deployed position B is shown.

In various examples, the displaceable platform 124 may include molded in attachment features and geometries that may provide for foam, perimeter, and tie-down trimming to achieve comfort and craftsmanship objectives.

A variety of advantages may be derived from use of the present disclosure. The suspension system 128 may be economical. The suspension system 128 may be integrated into a seat 60 that may include a seat cushion 112. The suspension system 128 may be used with a variety of vehicle 18 restraints to limit movement of a passenger 12 along a seat surface 61 during a sudden deceleration of the vehicle 18 (shown by arrow $F_1$ in FIG. 3). The suspension system 128 may act as a support for the seat cushion 112. The suspension system 128 may provide comfort support to a passenger 12 seated on the seat cushion 112. The suspension system 128 may also act as a hip and leg deceleration device as the suspension system 128 moves from the design position A to the fully deployed position B. The suspension system 128 may provide a location for securing trim and foam elements of the seat 60 to the suspension system 128.

It is also to be understood that variations and modifications can be made on the aforementioned structures and methods without departing from the concepts of the present disclosure, and further, it is to be understood that such concepts are intended to be covered by the following claims, unless these claims, by their language, expressly state otherwise.

What is claimed is:

1. A vehicle seating assembly comprising:
   a seat cushion;
   a seat frame assembly including:
      a carrier assembly; and
      a displaceable platform coupled to the carrier assembly and selectively deployable from a design position to a fully deployed position in response to a sudden deceleration of a vehicle, wherein the seat cushion is disposed on the displaceable platform, and wherein the carrier assembly includes a carrier including first and second opposing segments and a third segment extending between the first and second opposing segments, a cross member disposed laterally across the first and second opposing segments of the carrier, and a panel extending between the cross member and the third segment of the carrier.

2. The vehicle seating assembly of claim 1, wherein the cross member includes:
   a rotating joint defined by:
      a housing that extends between the first and second opposing segments of the carrier; and
      a rotating member disposed within the housing and attached to the displaceable platform.

3. The vehicle seating assembly of claim 2, wherein the rotating member rotates within the housing when the displaceable platform moves between the design position and the fully deployed position.

4. The vehicle seating assembly of claim 3, wherein the displaceable platform includes a first portion and a second portion.

5. The vehicle seating assembly of claim 4, wherein a hinge assembly is disposed between the first portion and the second portion, wherein the second portion is pivotably coupled to the first portion, and wherein the hinge assembly defines an axis about which the second portion rotates when the displaceable platform moves between the design position and the fully deployed position.

6. The vehicle seating assembly of claim 5, further comprising:
   bolsters protruding from the second portion of the displaceable platform.

7. The vehicle seating assembly of claim 5, wherein a retention mechanism extends between the second portion of the displaceable platform and the carrier.

8. The vehicle seating assembly of claim 7, wherein the retention mechanism is in a collapsed position when the displaceable platform is in a design position.

9. The vehicle seating assembly of claim 8, wherein the retention mechanism is in a fully extended position when the displaceable platform is in a fully deployed position.

10. The vehicle seating assembly of claim 9, wherein the retention mechanism comprises a two bar linkage.

11. The vehicle seating assembly of claim 1, wherein the displaceable platform is coupled to the carrier assembly with a fuse extending between the displaceable platform and the panel.

12. The vehicle seating assembly of claim 11, wherein the fuse breaks in response to a force indicative of the sudden deceleration of the vehicle.

13. A vehicle seat including:
    a foam cushion;
    a carrier coupled to a seat frame assembly and including first and second segments disposed on opposing sides of the foam cushion;
    a displaceable platform extending below the foam cushion and between the first and second segments, wherein the displaceable platform is movable between a design position and a fully deployed position in response to a force exerted on the displaceable platform;
    wherein the displaceable platform is rotationally coupled to a cross member that extends between the first and second segments of the carrier;
    wherein a retention mechanism is disposed between the displaceable platform and the carrier; and
    wherein the retention mechanism limits a movement of a front portion of the displaceable platform.

14. The vehicle seat of claim 13, wherein the cross member includes a circular housing that surrounds a rotating shaft, and wherein the displaceable platform is coupled to the rotating shaft.

15. The vehicle seat of claim 14, wherein the panel includes a first portion and a second portion, wherein the second portion of the panel is pivotably coupled to the first portion of the panel, and wherein the retention mechanism limits movement of the front portion of the panel.

16. A suspension system for a vehicle seat comprising:
    a displaceable platform coupled to a carrier assembly, wherein the displaceable platform is movable along the carrier assembly between a design position and a fully deployed position in response to a sudden deceleration of a vehicle; and
    an attachment mechanism disposed between the displaceable platform and the carrier assembly, wherein the attachment mechanism engages the displaceable platform to the carrier assembly when the carrier assembly is in the design position, wherein the attachment mechanism disengages the displaceable platform from the carrier assembly when the carrier assembly is in the fully deployed position, wherein the carrier assembly comprises a carrier including first and second opposing segments and a third segment extending between the first and second opposing segments and a cross member extending between the first and second opposing segments and including a housing that surrounds a rotating shaft and a retention mechanism disposed between the carrier and the displaceable platform, and wherein the attachment mechanism includes a fuse.

17. The suspension system for a vehicle seat of claim 16, wherein the displaceable platform includes a hinge assembly disposed between a first portion of the displaceable platform and a second portion of the displaceable platform.

* * * * *